Figures 1, 2, 3, 4:
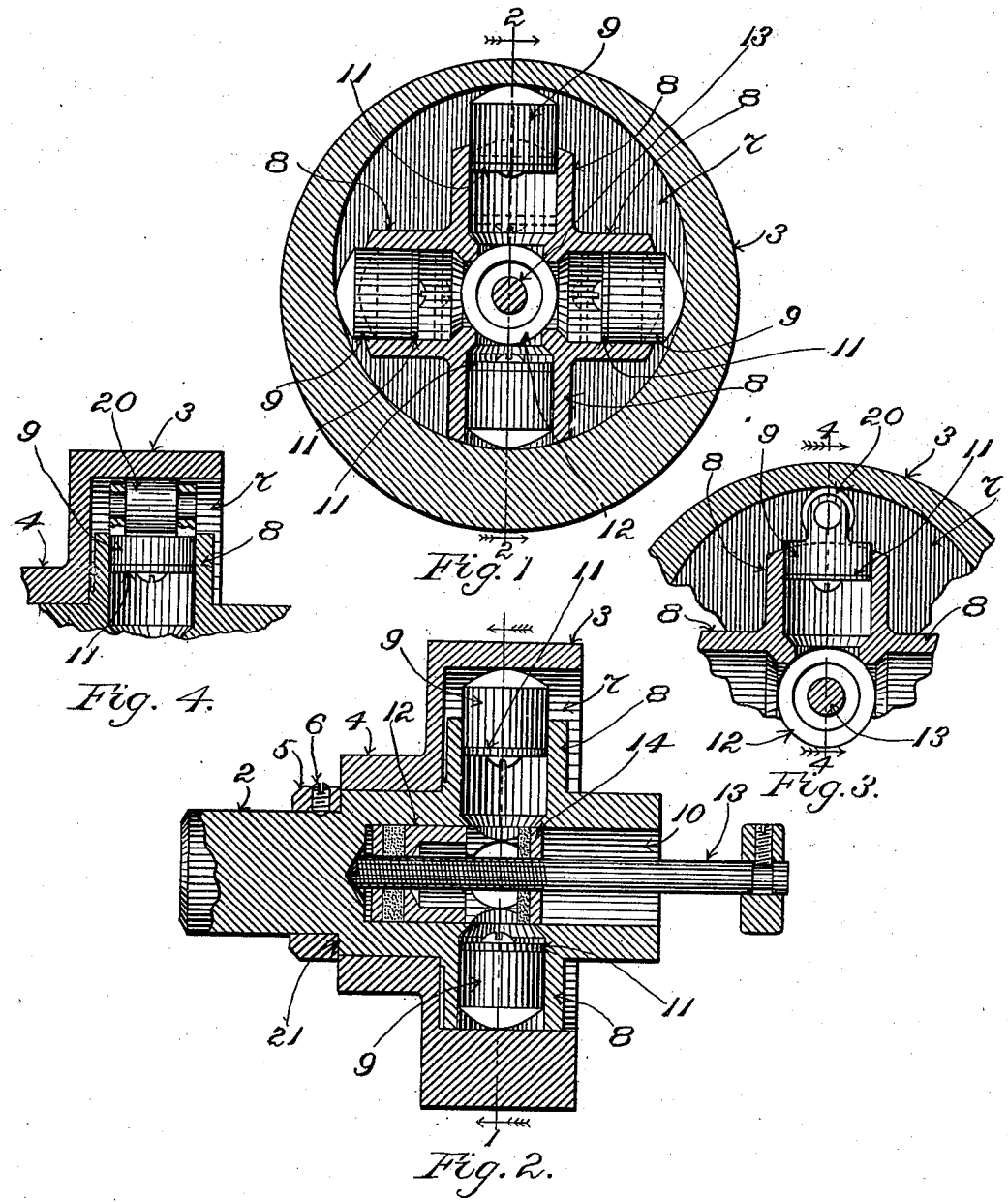

No. 661,001. Patented Oct. 30, 1900.
J. T. RYTHER.
FLUID CLUTCH.
(Application filed Dec. 29, 1899.)

(No Model.)

Witnesses:
Oscar F. Hill
Robert Wallace

Inventor:
James T. Ryther
by MacLeod Calver & Randall
his Attorneys.

UNITED STATES PATENT OFFICE.

JAMES T. RYTHER, OF LYNN, MASSACHUSETTS.

FLUID CLUTCH.

SPECIFICATION forming part of Letters Patent No. 661,001, dated October 30, 1900.

Application filed December 29, 1899. Serial No. 741,953. (No model.)

*To all whom it may concern:*

Be it known that I, JAMES T. RYTHER, a citizen of the United States, residing at Lynn, in the county of Essex, State of Massachusetts, have invented a certain new and useful Improvement in Fluid Clutch Mechanism, of which the following is a specification, reference being had therein to the accompanying drawings.
My invention has for its object to provide a simple, durable, and efficient device by means of which a pulley, wheel, or the like may be rendered fast or loose on a shaft or may be caused to rotate at any degree of speed relatively to and less than the speed of rotation of the shaft.

A device embodying my invention is fully set forth in the following description, taken in connection with the accompanying drawings, and the novel features of my invention are pointed out and clearly defined in the claim at the close of this specification.

Having reference to the drawings, Figure 1 is a vertical section transversely of a pulley and shaft having an embodiment of my invention applied thereto, said section being on line 1 1 of Fig. 2. Fig. 2 is a lengthwise section thereof on line 2 2 of Fig. 1. Fig. 3 shows a modification hereinafter referred to.
Fig. 4 is a section on line 4 4 of Fig. 3.

2 designates a shaft or portion thereof, and 3 a pulley having a hub 4, which is journaled on said shaft. A collar 5 is secured on said shaft by means of a set-screw 6, said collar serving to hold the pulley in position on said shaft 2, adjacent the shoulder 21, (see Fig. 2,) and thereby prevent displacement of the pulley 3. A recess 7 is formed in the face of the pulley, said recess being eccentric relatively to the axis thereof, as shown. The shaft 2 at that portion thereof which is within the recess 7 is provided with two or more radial projections 8. Four said projections are shown in the drawings, and I prefer that number. The said projections are preferably tubular, the interior spaces thereof forming cylinders or chambers to receive the cylindrical pistons or plungers 9. The shaft 2 is provided with a recess or cavity 10, extending lengthwise thereof, and the cylinders or chambers of the hollow radial projections 8 open at their inner ends into said recess or cavity 10. Each of the pistons or plungers 9 is suitably packed at its inner end at 11, so that fluid which is contained within the hollow projections and cavity cannot escape past the pistons or plungers. The recess or chamber 10, which extends lengthwise of the shaft 2, is preferably circular in cross-section and is fitted with a plunger or valve 12, which is cylindrical and of sufficient length to extend completely across and thus close the openings by which the inner portions of the radial cylinders or chambers communicate with the recess or cavity 10. The said plunger or valve 12 is also suitably packed and is provided with a valve-stem 13, which projects outside the said opening 10 to permit the ready operation of said valve. A second plunger or disk 14, which is also suitably packed to prevent the escape of fluid, is secured on the stem 13 at such a distance from the plunger or valve 12 as that when the latter is in its inmost position (shown in Fig. 2) the disk 14 will be on the opposite side of the openings which lead from the recess 10 to the hollow spaces behind the pistons or plungers 9 in the radial arms 8, as shown in Fig. 2. When the parts are in this latter position, it will be clear that there is an open space between the plungers 14 and 12, which opens into the space behind each of the pistons or plungers 9, so that the contained fluid may move freely through the spaces between the said plungers 12 and 14 and into and out of the spaces behind the pistons or plungers 9.

I provide for introducing the fluid an opening (not shown) in one of the radial arms, which opening should be provided with means for securely closing the same. As the shaft 2 revolves, carrying with it the pistons or plungers 9, which are located within the eccentric recess 7, the fluid may move freely behind the said pistons or plungers 9, and as the said pistons or plungers, respectively, are forced inwardly toward the axis of the shaft by contact of their outer ends with the wall of the eccentric recess 7 the oppositely-placed ones will be forced outward correspondingly by the pressure of the fluid behind them. If now the valve-stem 13 be moved outwardly in the recess 10, causing the plunger 12 to close that portion of the recess 10 which is connected with each of the hollow spaces behind the pistons or plungers, it will be clear that the fluid behind that one of the plungers 9 which is in the outermost position—that is, farthest away from the axis of the shaft—cannot escape, as that plunger moves around the shaft and will prevent the said piston or plunger from being forced inwardly by contact of its outer end with the wall of the eccentric recess 7. As the said plunger cannot be forced backwardly or inwardly toward the axis of the shaft, the rotation of the shaft relatively to the pulley 13 will be stopped—that is, the pulley and shaft will be forced to revolve together. It will be clear, therefore, that by simply moving the stem, so as by means of the plunger or valve 12 to close the central opening in the recess 10 behind each of the radial chambers, the device may be made to operate as a clutch to lock the pulley fast on the shaft. If the said opening, however, be not wholly closed, but only partially, the movement of the fluid behind the pistons or plungers 9 will be retarded, and the shaft will be permitted to move relatively to the pulley at a speed proportionate to the degree of retardation of the fluid. In this way the speed of the pulley or of the shaft relatively to each other may be varied quickly and effectively. I have shown the best forms of my device now known to me, but do not desire to limit myself to any precise details of construction.

The device may be used as a clutch mechanism in connection with shafting or machinery of various kinds, and also as a speed-varying device not only for shafting and pulleys in connection with machinery, but also for automobiles, or in any machine where it is desirable without varying the speed of the driver to vary at will the speed of the driven.

As will be clear, either the pulley or the shaft may be the driving or driven member. I do not desire to limit my invention to the radial arrangement of the projections or cylinders 8, as the same may be arranged tangentially, if desired.

In the modification shown, Figs. 3 and 4, the pistons or plungers 9 instead of having the ends thereof in contact with the wall of the eccentric recess 7 are each provided with a friction-roll 20, the rolls 20 serving to decrease the wear between the plungers and the wall of the said eccentric recess. This construction I deem preferable, especially when the device is used as a means of varying relatively the speeds of the shaft and pulley.

I claim as my invention—

The improved device comprising the interior member provided with a plurality of radial chambers having central communication with one another, pistons in said chambers, the exterior member having an eccentrically-disposed wall acting upon the said pistons, and the centrally-located valve comprising essentially the cylindrical plunger 12 and the plunger or disk 14 separated from each other as set forth whereby the movement of the fluid may be controlled as desired, substantially as described.

In testimony whereof I affix my signature in presence of two witnesses.

JAMES T. RYTHER.

Witnesses:
WM. A. MACLEOD,
CHAS. F. RANDALL.